UNITED STATES PATENT OFFICE

ARTHUR N. PARRETT, OF WILMINGTON, DELAWARE, ASSIGNOR TO E. I. DU PONT DE NEMOURS & COMPANY, OF WILMINGTON, DELAWARE, A CORPORATION OF DELAWARE

RUBBER-COATED FABRIC AND PROCESS OF MAKING IT

No Drawing.  Application filed October 22, 1927. Serial No. 228,098.

This invention relates to the production of rubber-coated fabric such as that used for automobile tops, both for the open and closed type of automobile, for upholstery, rain coats and for other analogous purposes. More particularly, it relates to the production of rubber-coated fabric having a smooth, durable finish which retains its gloss for a long time, even when exposed to severe weather conditions.

Heretofore, various materials have been suggested and used, among which may be mentioned oil-coated fabrics, rubberized fabrics, and pyroxylin-coated fabrics. Other methods have also been suggested, but none of these prior products has been found to be satisfactory, since each presents some serious drawback. Oil-coated fabrics, for example, have the disadvantage of being high in cost and liable to cold crack. The rubberized fabrics have been found to be poor bases for the varnish top coat with which they are customarily finished when used, for example, as automobile tops. This defect of such rubberized material is probably due to the difference in the elasticity of the rubber and the varnish. Pyroxylin-coated fabrics have heretofore presented the drawback of requiring a number of coatings to give the required thickness, each coat requiring being dried separately. Further, such pyroxylin lacquers have found little satisfactory application to rubber-coated fabrics because of difficulties which are probably due to the difference in physical properties between a film of rubber and a film of pyroxylin lacquer. A rubber film is usually extremely pliable and distensible, whereas a film of pyroxylin lacquer is inclined to be brittle and but slightly distensible. Consequently, a combination of these two films will not stand up under the conditions of service of artificial leather. Flexing or bending of rubberized fabrics coated with ordinary pyroxylin lacquers causes the lacquer to crack or craze and finally to fall away completely from the rubber. The lack of pliability and distensibility of pyroxylin compositions explains only partially the reason why they have been found unsatisfactory as finishes for rubberized fabrics. An important defect of pyroxylin compositions over rubber surfaces or varnished rubber surfaces is their lack of adhesion to these surfaces. Also, when they are exposed to sunlight and weathering, very rapid deterioration takes place as evidenced by cracking and peeling of the pyroxylin composition from the surface of the rubber.

Accordingly, the present invention is concerned with the production of articles of rubber-coated fabric which are free from the defects and disadvantages of the articles and methods heretofore used in this art. These objects and advantages are obtained by coating rubberized fabrics or varnished rubberized fabrics with a pyroxylin composition which exhibits good adhesion to a rubber surface or to a varnished rubber surface, and which has sufficient distensibility and pliability so that the lacquer will not crack, craze, or peel when the finished material is flexed, bent or scrubbed.

The following more detailed description of the invention is given by way of illustration only, and is not to be understood as limiting the invention, since various changes therein will be obvious to those skilled in the art, and may be made without departing from the spirit and scope of the invention as defined by the appended claims.

For the purposes hereinabove set forth, the rubberized fabrics or varnished rubberized fabrics are coated with a pyroxylin composition which contains a substantial amount of drying oil, the latter serving to produce satisfactory adhesion properties in the lacquer for rubber or varnished rubber surfaces. In order to secure good adhesion, it is desirable to use the drying oil at least equal in weight to the quantity of pyroxylin, and it is preferable to use considerably higher ratios of drying oil to pyroxylin if the highest degree of adhesion and flexibility is required. Further, lacquers containing higher ratios of drying oils are more distensible and pliable and consequently have less tendency to crack or craze when the goods are flexed or bent. The compositions will, therefore, generally contain as principal ingredients: pyroxylin, drying oil, pigments, and solvent.

Practically any type of nitrocellulose ordinarily used for lacquers may be used in the compositions of the present invention, but pyroxylin of extremely high viscosity is generally undesirable, because of the difficulty of applying a very viscous lacquer in the plant.

The type of drying oil used in these lacquers is of importance, linseed, china wood, and perilla oils being the most suitable for the particular purpose. The drying oil used should, desirably, be compatible with the nitrocellulose, and such compatibility may be enhanced by blowing or heat treating the oils. Excellent results have been obtained with drying oils that have been air blown at elevated temperatures, although certain heat-treated oils are fairly satisfactory. Any oils may be used that possess sufficient drying properties and are sufficiently compatible with nitrocellulose. Among the oils that may be used, in addition to those set forth above, may be mentioned blown or treated rape seed oil, menhaden oil, or soya bean oil.

The pigments used may be widely variant in character, depending on the particular color desired. In general, those pigments generally found suitable for use in paints, enamels or ordinary lacquers may be used.

Softeners or plasticizers may be desirably used in these lacquers, but are not essential. Trycresyl phosphate, dibutyl phthalate, castor oil, dibutyl tartrate, or other plasticizers and softeners are among those available. In every case, however, it is desirable to use the softener or plasticizer in considerably smaller amounts than the drying oil. For example, it is preferable to use not more than five parts of pyroxylin softener or plasticizer based on ten parts by weight of pyroxylin, whereas as high as forty or fifty or even more parts of drying oil may be used.

The following examples will serve to illustrate lacquers that have been successfully used in plant operations:

*Example I*

| | Parts by Weight |
|---|---|
| Pyroxylin | 100 |
| Blown linseed oil | 267 |
| Pigment | 167 |
| Plasticizer | 10 |
| Drier | 33 |
| Composite solvent | 1320 |

*Example II*

| | Parts by Weight |
|---|---|
| Pyroxylin | 100 |
| Blown China wood oil | 283 |
| Pigment | 170 |
| Plasticizer | 27 |
| Drier | 27 |
| Composite solvent | 1520 |

The lacquers described above may be used for making lacquered rubberized fabrics suitable for rain coats, upholstery material, automobile top material, automobile deck material, novelty goods, and for practically any of the purposes for which rubberized fabrics or artificial leather may be used.

In making such fabrics, the process used for spreading or applying the lacquer may vary widely. Any practical method such as flowing, or flowcoating, may be used. The process of using a pyroxylin lacquer of the above mentioned composition is not dependent on the method used in manufacturing the rubber-coated fabric. The manufacture of the latter may include a process of embossing or graining; hence, in making artificial leather by this invention, the lacquer containing drying oil may be applied over a rubber-coated fabric which may or may not be embossed and which may or may not be varnished. In case the rubber-coated fabric has been embossed, a very desirable effect may be obtained by applying the lacquer to the surface with a souping knife which scrapes the lacquer from the ridges or high places of the surface and coats only the depressions or valleys of the embossing with the lacquer. This process is called souping and is commonly used in the artificial leather industry. If a colored lacquer is souped over an embossed rubber surface or varnished rubber surface of different color, a two-color or two-tone effect results, which gives a very satisfactory imitation of leather.

When it is desired to apply a continuous film of lacquer to a rubberized fabric, a roller may be used, particularly if the material has been previously embossed. However, the use of the lacquers herein disclosed as soups, rather than as continuous coatings, offers advantages, in that a discontinuous film, such as that obtained by souping, has less tendency to crack or craze when the goods are flexed or bent.

The lacquers described above may be used either in a one-coat system, or in a two-coat system, but in all cases the pyroxylin-drying oil composition forms the final coat. In using the one-coat system, which is the simplest form of the invention, the coat of pyroxylin-drying oil composition is applied over the cured rubber. Such treatment produces on the surface of the goods, a smooth continuous film which is inert and which remains for a long time unaffected by sunlight. A double coat of pyroxylin-drying oil composition may be used, but is not necessary.

In using a two-coat system, the rubberized fabric is first desirably coated with an oil varnish, before the application of the final coat of pyroxylin-drying oil composition. The oil varnish which thus constitutes the intermediate coat consists essentially of drying oil, gum, and thinner. In addition, pigments may be used in some cases. The proportion of drying oil to gum may vary within rather wide limits, depending on the specific requirements. In some cases, there may be used a varnish having an oil length of 25 to 40 gallons per 100 lbs. of gum. In general, however, and especially where the maximum durability of product is required, there is used a longer oil varnish in which the oil length is not less than 40 gallons, and in some cases a varnish of oil length up to 300 gallons, or even higher, may be used. As gums, there may be used any of the natural or synthetic varnish resins such as kauri, ester gum, hardened rosin, etc., and with these there may be added various gums of an asphaltic nature such as stearin pitch, gilsonite, or petroleum asphalt. The oils used in the preparation of the oil varnish are preferably the bodied drying oils containing driers commonly used in the varnish trade.

By the term "oil varnish" as used in this specification is meant a protective coating composition in the drying or hardening of which there is involved the oxidation of a drying oil. This oil varnish may contain resins and/or ingredients of an asphaltic nature.

In using the two-coat system, two methods may be employed. The rubberized fabric in uncured condition may be coated with the oil varnish, and the coated material then dried, and finally subjected to a baking operation sufficient to complete vulcanization of the rubber. After such vulcanization treatment, the coated fabric may then be given the final coat of pyroxylin-drying oil composition. In the second method available, the intermediate coat is applied to cured rubberized fabric, and either air dried, or dried at an elevated temperature. Drying at elevated temperature is more advantageous from the cost standpoint, and may consist of drying for about four hours at approximately 180° F. After drying, the pyroxylin-drying oil composition is applied. The lacquer composition dries rapidly, particularly if a sufficient quantity of drier has been included in the composition.

The two-coat system as described above yields greatly improved results over prior art products, and even over the products obtained by the one-coat system. By means of the device of the two-coat system of the particular kind set forth above, the final product is rendered practically free of the drawback of streaking or scuffing when rubbed by a hard object such as the thumb nail. Further, the products obtained by the two-coat system are in addition more durable and retain their gloss for a longer time than products made by the one-coat system. The explanation of the superiority of the two-coat system is not definitely known, but it is believed that such superiority lies in the fact that the elastic intermediate coat of oil varnish acts as a buffer or bridge between the extremely elastic rubber compound and the less elastic pyroxylin composition. Further, the pyroxylin lacquer probably acts as a surface skin protecting the dried oil film of the oil varnish intermediate coat from further and destructive oxidation. If the pyroxylin lacquer has been rendered opaque by pigments, due to such opacity, both the oil varnish film and the rubber are protected from the disintegrating effect of direct sunlight.

Among the advantages of the present invention the following may be noted. In the first place, it is found that good adhesion is obtained between the rubber surfaces or varnished rubber surfaces and the pyroxylin composition. Heretofore, pyroxylin lacquers have seldom found use over pliable, flexible rubberized fabrics because of insufficient adhesion. Further, the articles described above, and made according to this invention, exhibit excellent weathering properties. Rubber fabrics coated with known pyroxylin compositions deteriorate very rapidly when exposed to the weather, whereas the drying oil-pyroxylin lacquers are not subject to rapid deterioration under similar conditions. Again, it may be noted that pyroxylin and its compositions heretofore available were not distensible and pliable enough for use as a finish for rubberized fabrics. Even when softeners and plasticizers are added to the pyroxylin there is a tendency for the finish to crack or craze when the goods are flexed or bent. Drying oil-pyroxylin compositions, on the other hand, more closely resemble long oil varnishes in physical properties and therefore are satisfactory as finishes for rubber surfaces in the same way that long oil varnishes are satisfactory.

A still further advantage of the drying oil-pyroxylin compositions when applied to rubberized fabrics lies in the fact that when such coated material has passed over a hot steam table, the material may be immediately rolled up. Drying oil varnishes require baking or heating for several hours in order to dry well enough to roll up the goods. Accordingly, drying oil-pyroxylin compositions do not require an extra festooning or baking step. Consequently, the products of the present invention are free from the disadvantages and defects of prior art products, and further, offer improved results not heretofore obtainable.

Claims:

1. The process of manufacturing rubber coated fabric which comprises applying a coat of rubber to fabric, embossing, applying a pigmented varnish containing oil and asphalt thereover, baking to vulcanize the rubber and dry the varnish, and souping, with a composition containing pyroxylin and a drying oil.

2. The process of manufacturing rubber coated fabric which comprises applying a coat of rubber to fabric, embossing, applying a pigmented varnish containing oil and asphalt thereover, baking to vulcanize the rubber and dry the varnish, and souping with a composition containing pyroxylin, a pigment and a drying oil.

3. A coated covering material comprising a fabric base, an embossed vulcanized rubber coating, a layer of baked pigmented varnish containing oil and asphalt, and a discontinuous coating containing pyroxylin and a drying oil.

4. A coated covering material comprising a fabric base, an embossed vulcanized rubber coating, a layer of baked pigmented varnish containing oil and asphalt, and a discontinuous coating containing pyroxylin, a pigment and a drying oil.

In testimony whereof I affix my signature.

ARTHUR N. PARRETT.